United States Patent

[11] 3,591,852

[72] Inventor Arthur C. M. Chen
Schenectady, N.Y.

[21] Appl. No. 792,486
[22] Filed Jan. 21, 1969
[45] Patented July 6, 1971
[73] Assignee General Electric Company

[54] NONVOLATILE FIELD EFFECT TRANSISTOR COUNTER
14 Claims, 11 Drawing Figs.

[52] U.S. Cl. .......... 307/225, 307/279, 307/304, 307/227
[51] Int. Cl. .......... H03k 25/02
[50] Field of Search .......... 307/223, 238, 279, 304, 220, 205, 225, 227; 328/39.5

[56] References Cited

UNITED STATES PATENTS

| | | | |
|---|---|---|---|
| 2,791,758 | 5/1957 | Looney | 307/251 X |
| 3,283,221 | 11/1966 | Heiman | 307/304 X |
| 3,378,698 | 4/1968 | Kadah | 307/225 |
| 3,500,142 | 3/1970 | Kahng | 317/235 |

OTHER REFERENCES

RCA TECHNICAL NOTES No. 623 March 1965 " Frequency Dividers Including Insulated Care Transistors" by Burns et al. (copy enclosed)

*Primary Examiner*—John S. Heyman
*Attorneys*—Richard R. Brainard, Paul A. Frank, John J. Kissane, Frank L. Neuhauser, Oscar B. Waddell and Melvin M. Goldenberg

ABSTRACT: Conductor-insulator semiconductor field effect transistors characterized by a nonuniform charge in the insulator under a large voltage bias at room temperatures are employed as nonvolatile counters wherein the count per stage is controlled by the amplitude and/or pulse width of large voltage count pulses applied to the transistor. The charge switching characteristic produces a generally cumulative time-voltage shift in the transistor transfer characteristic and the transistor switches from a substantially nonconductive state to a stable conductive state after a predetermined number of count pulses have effected a shift in the transfer characteristic to a constantly applied DC bias. The transistor then can be reset to a different switching count for identical applied count pulses by a variation in the amplitude and/or period of the reset voltage applied to the transistor gate electrode. Preferably the transistors are cascaded to produce a nonvolatile, highly accurate counter having a minimum number of semiconductive devices per stage.

Figure 1:
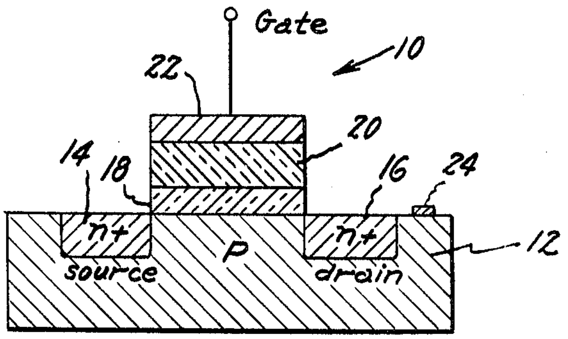

Inventor:
Arthur C.M. Chen,
by John J. Kissane
His Attorney.

Inventor:
Arthur C.M. Chen,
by John J. Kissane
His Attorney.

Inventor:
Arthur C.M. Chen,
by John J. Kissane
His Attorney.

Inventor:
Arthur C. M. Chen,
by John J. Kissane
His Attorney.

NONVOLATILE FIELD EFFECT TRANSISTOR COUNTER

THE DISCLOSURE

This invention relates to a nonvolatile transistorized counter and in particular to a nonvolatile counter employing a conductor-insulator-semiconductor field effect transistor having a nonuniform stored charge in the insulator under a large voltage bias at room temperatures. The charge switching characteristic of the transistor permits a cumulative shift in the transfer characteristic upon the application of successive large voltage biasing pulses (hereinafter referred to as count pulses) and the conductive state of the transistor is switched when the transfer characteristic shifts to a constantly applied biasing voltage.

Transistorized counters heretofore have been fabricated as binary counting circuits wherein a plurality of transistors are employed to switch successive stages of the counter between a conductive and nonconductive state, or low and high voltage states, dependent upon the conductive mode of the plurality of transistors in response to switching pulses applied to the gates of the plurality of transistors. The output count obtainable from transistorized counters however is fixed at a given value dependent upon the number, and electrical interconnection, of the switching transistors forming the counter and the count necessarily is limited to powers of two unless a complex combinational switching network is included in the transistor network. Binary counters also generally require a plurality of switching units per stage to effect counting and characteristically are volatile with a loss of the recorded count immediately occurring upon an interruption in the energization of the counter.

It is therefore an object of this invention to provide a generally nonvolatile transistorized counter employing a minimum number of switching units per stage.

It is also an object of this invention to provide a counter capable of switching at diverse counts dependent upon the amplitude and/or pulse width of the applied count pulse.

It is a further object of this invention to provide a counter wherein the magnitude of the count can be altered by a variation in the amplitude and/or pulse width of the reset signal, or by a variation in the amplitude of an enabling signal applied simultaneously with the count pulse.

It is also an object of this invention to provide a nonvolatile counter wherein a minimum amplitude gating pulse is employed to effect a desired shift in the transfer characteristics of the transistors forming the counter.

These and other objects of this invention are accomplished in a nonvolatile counter employing at least one transistor exhibiting a nonuniform stored charge distribution in the insulator under a large voltage bias and means for applying a plurality of gating pulses of a predetermined configuration to the transistor. The gating pulses are shaped to a chosen amplitude in excess of the threshold value required to shift the transfer characteristics of the transistor (thereby altering the biasing voltage required for switching the transistor between a conductive and nonconductive state) and the width of the gating pulses is set to a value less than the width required for a single gating pulse of the chosen amplitude to shift the transfer characteristic from an original position to a preselected biasing voltage applied to the gate electrode of the transistor. When the number of applied gating pulses effect a cumulative shift of the transfer characteristic to the preselected transistor biasing voltage, the conductive state of the transistor is altered and means provided for detecting the conductivity of the transistor serve to indicate the application of a predetermined number of gating pulses to the transistor. Means also are provided for applying a reset voltage pulse to the gate electrode of the transistor in a polarity opposite the polarity of the gating pulses to shift the transfer characteristic in an opposite direction thereby returning the transistor to the original conductive state.

When high accuracy or an enlarged count is desired, a plurality of transistors having an unstable charge distribution under a large voltage bias are cascaded with the source and drain electrodes of each transistor respectively being connected to common sources of potential. Count means are connected to the transistor gate electrode for applying pulses of magnitude sufficient to shift the transfer characteristic toward a predetermined biasing voltage and first switching means are disposed between the count means and the gate electrodes of each of the plurality of transistors for blocking the pulses from the count means to the gate electrode of each transistor dependent upon the state of conduction of the transistor. Second switching means also are provided interconnecting each of the transistors with an adjacent transistor for applying pulses from the count means to the gate electrode of each transistor only upon a switching of the conductivity of the interconnected transistor. In a preferred cascaded configuration wherein conventional insulated gate field effect transistors (hereinafter IGFETS) are employed as the switching means for blocking the count pulses to the gate electrodes, an enabling signal is applied to the semiconductive substrates of the transistors having shiftable transfer characteristics to reduce the amplitude of the pulses from the count means required to shift the transfer characteristics.

Figure 2:
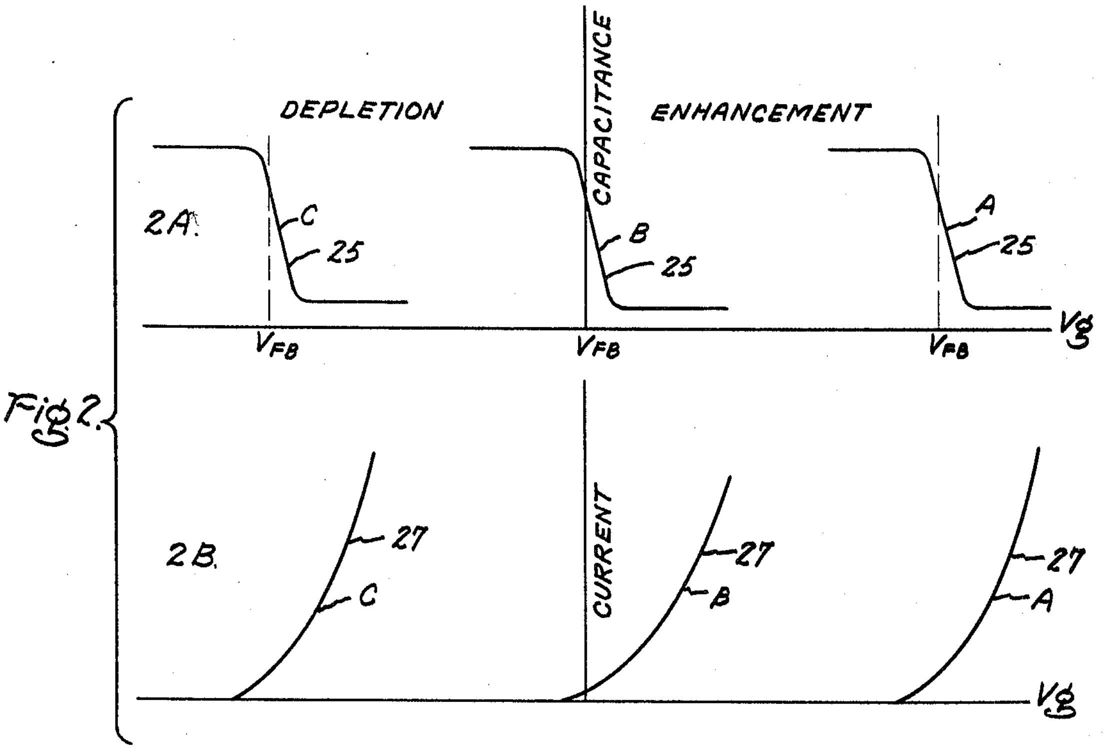
Figure 3:
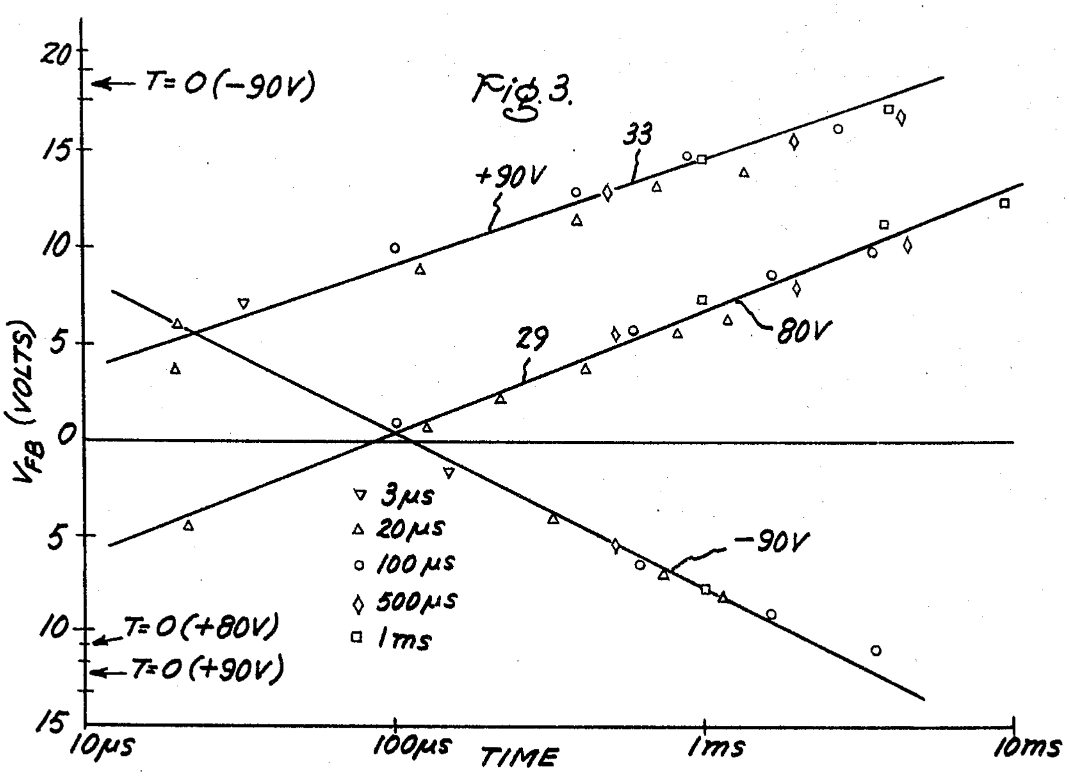
Figure 4:
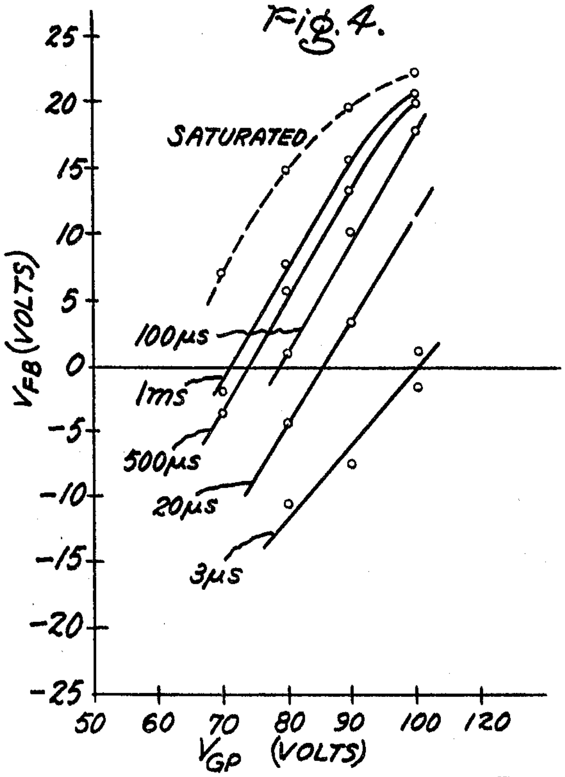
Figures 5, 6:
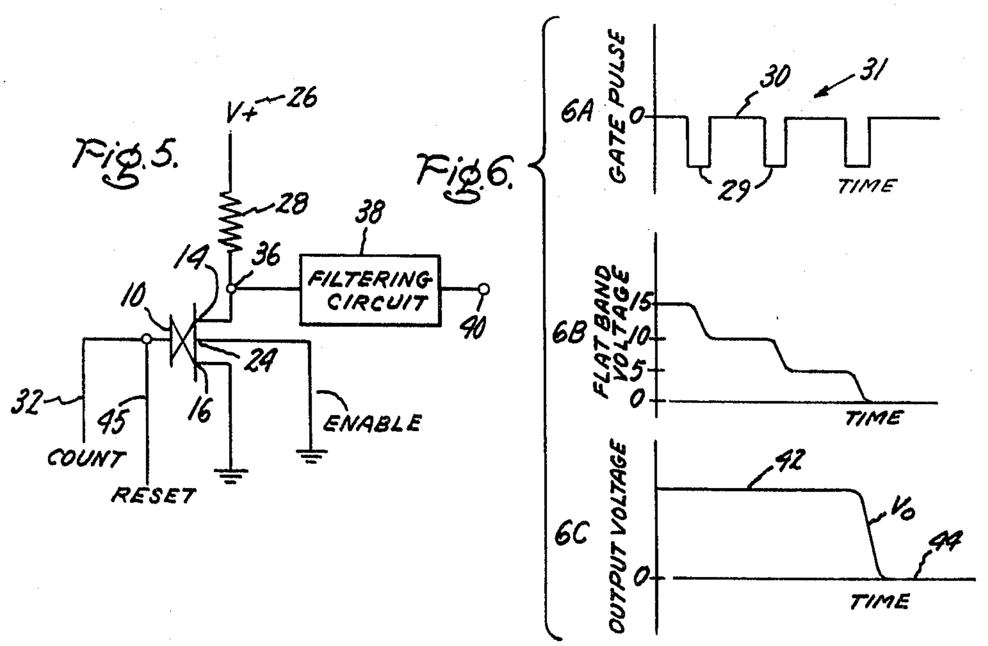
Figures 7, 8:
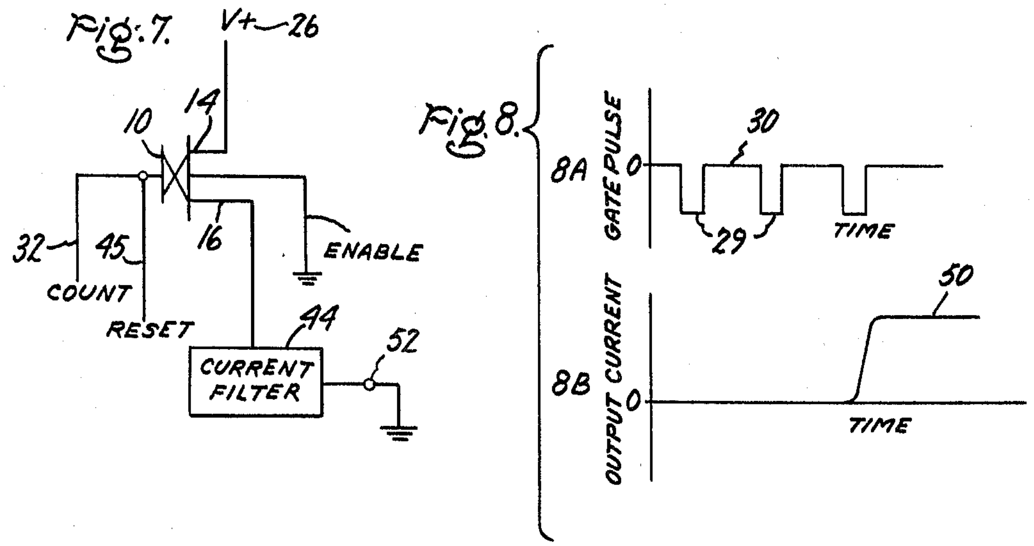
Figure 9:
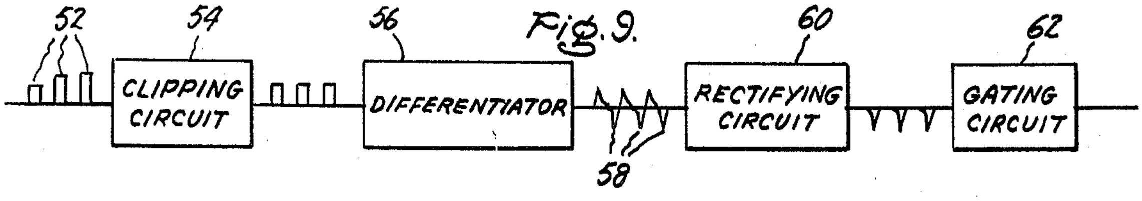
Figure 10:
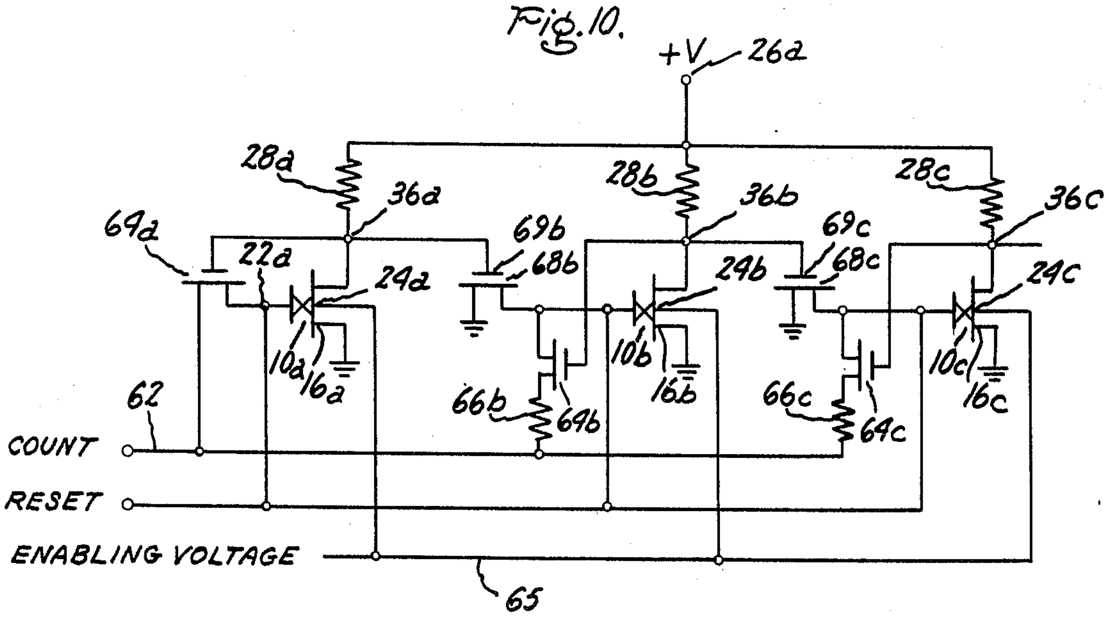
Figure 11:
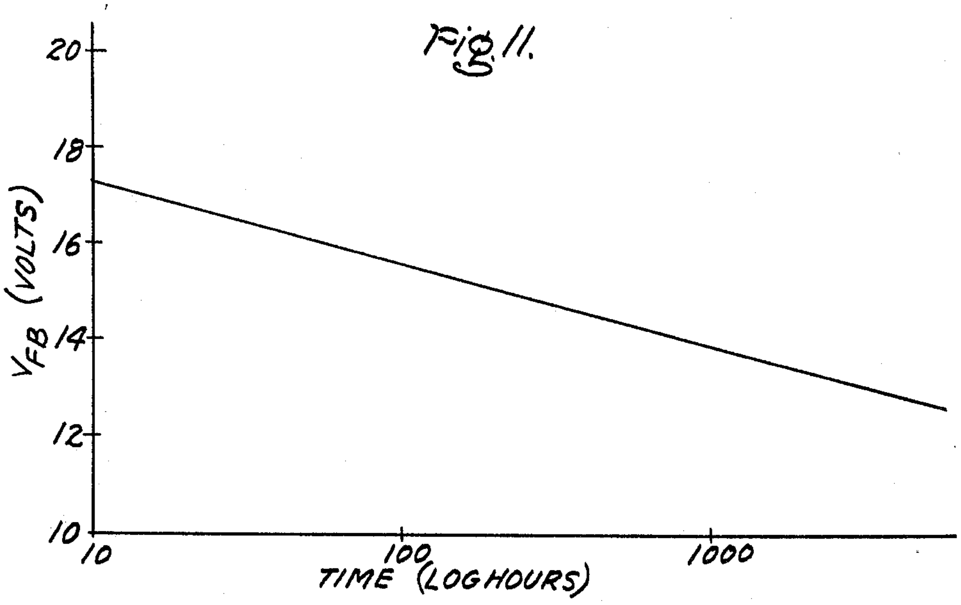

The novel features believed characteristic of the invention are set forth in the appended claims. The invention itself, together with further objects and advantages thereof may best be understood by reference to the following description, taken in connection with the accompanying drawings, in which:

FIG. 1 is a sectional view of a transistor employed in the counter of this invention, FIG. 2 is a pictorial illustration illustrating the shift in the C–V and transfer characteristics of the transistor of FIG. 1 upon the application of count pulses to the transistor, FIG. 3 is a graph depicting the accumulated time dependence of the flat band voltage of the transistor of FIG. 1 for various amplitude count pulses, FIG. 4 is a graph depicting the change in flat band voltage with the amplitude and pulse width of various count pulses, FIG. 5 is a schematic diagram of a simplified counter constructed in accordance with this invention, FIG. 6 is a pictorial illustration of electrical waveform at various locations in the counter of FIG. 5, FIG. 7 is a schematic diagram of a second counter in accordance with this invention, FIG. 8 is a pictorial illustration of current waveforms at various locations in the counter of FIG. 7, FIG. 9 is a block diagram of a wave shaping circuit suitable for forming count pulses for the counter of this invention, FIG. 10 is a schematic diagram of a three stage counter in accordance with this invention, and FIG. 11 is a graph illustrating the variation in flat band voltage with time under short circuit conditions for the transfer of FIG. 1.

A conductor-insulator-semiconductor field effect transistor (hereinafter referred to by the term CISFET) 10 suitable for utilization in the counter of this invention is depicted in FIG. 1 and generally includes a semiconductive, e.g. silicon, substrate 12 of P-type conductivity having n-type conductivity source and drain electrodes 14 and 16 respectively, diffused therein by conventional techniques such as the diffusion of an antimony or phosphorus impurity into substrate 12. A thin, e.g. 300 A., silicon dioxide layer 18 is formed atop silicon substrate 12 intermediate the source and drain electrodes by any suitable process such as thermal oxidation of the silicon substrate in a flowing oxygen induction heated reactor over a time interval from 1—5 minutes with the substrate being held at a temperature of approximately 1000° C. An approximately 1500 A. layer of silicon nitride 20 then is deposited atop oxide layer 18 employing techniques such as are described in an article by Chu et al. in Solid State Electronics, Vol. 10, pp 897—905 (1967) wherein $Si_3N_4$ films are formed by the nitridation of silane with ammonia. The oxide coated silicon substrate is heated to a temperature in the range of 800° C. to 1100° C. and deposition of silicon nitride is effected at a rate of 50 to 200 A./minute from a mixture of ammonia and silane in a molar ratio of $10^4$ flowing over the substrate at a rate of 20—40 liters/minute. After deposition of silicon nitride layer 20, an aluminum gate electrode 22 is deposited by vacuum evaporation atop the silicon nitride and windows are photoetched through the insulator to make contact to the source and drain electrodes. An additional contact to substrate 12 then is effected by suitable means, e.g. by diffusion of a P-type impurity such as boron into the substrate or by the deposition of an aluminum contact 24 thereon, to permit biasing of substrate 12 with an enabling voltage.

The accumulation and depletion characteristics of CISFET 10 are illustrated by the shift in the flat band voltage of the capacitance DC biasing voltage characteristic (hereinafter referred to as the C–V characteristic), as is depicted in FIG. 2A, and the associated shift in the transfer characteristics, portrayed in FIG. 2B, upon the application of a voltage pulse of sufficient magnitude to gate electrode 22. The C–V characteristics were measured by initially applying a DC count pulse of an amplitude greater than 50 volts to gate electrode 22 and subsequently measuring the small signal AC capacitance of the structure as the gate electrode was slowly swept by a DC biasing voltage having an amplitude less than 30 volts. The gate electrode acted both as the read and the write electrode and a small signal AC (100KC) capacitive bridge was employed to measure capacitance. The measured results were employed to obtain the C–V characteristic of FIG. 2A and the flat band voltage was derived from the C–V characteristic in a conventional fashion, i.e. the flat band voltage is the biasing voltage at the initiation of a linear decrease in capacitance. As can be seen from the curves of FIGS. 2, applied pulses of less than −50v. shift the C–V curve 25 and the associated transfer characteristic 27 toward the depletion region, e.g. from curves A to curves B to curves C with increased negative pulsing of gate electrode 22, while an applied positive pulse of greater than +50v. to the gate electrode shifts the C–V and transfer characteristics toward the enhancement region e.g. from curves C and curve B to curves A. Because the flat band voltage is approximately equal to the turn on voltage required for switching CISFET 10 to a conductive state, the shift in flat band voltage produced by the applied count pulses alters the magnitude of the biasing voltage required to alter the conductive state of the CISFET.

Although CISFET 10 is described as having an insulator formed by juxtaposed silicon nitride and silicon dioxide layers because of the enhanced shift characteristic of a transistor of such structure, any field effect transistor exhibiting a nonuniform stored charge distribution in the insulator under a large voltage bias, i.e. exhibiting a shift in the transfer characteristic of the transistor with an applied large voltage gate pulse, also can be employed to from the counter of this invention. For example, various gate insulator materials, such as oxynitride and aluminum oxide ($A1_20_3$) juxtaposed with thin layers of a high quality insulator such as $Si0_2$, also exhibit a transfer characteristic shift upon the application of an enlarged gate pulse. Insulators exhibiting transfer characteristic shift under an applied large voltage bias often are described as "leaky insulators with traps." Generally, their characteristics are as follows: Electronic current is strongly time dependent because of space charge and trapping effects. The charge and discharge currents decrease with time in a manner like that of $Si0_2$. The electronic currents, besides being strongly time dependent, are also strongly dependent on the polarity of the applied voltage which may be caused by the differences in the potential barriers for hole and electron injection at the semiconductor and gate electrode interfaces. These characteristics together with the generally poor insulating and trapping effects cause hysteresis in the differential AC capacitance vs. voltage curves as electronic charge is alternately driven in and out of the film by a voltage sweep. The amount of hysteresis of course similarly depends on the magnitude of the voltage excursions and sweep speed.

Many theories have been advanced to explain this heretofore generally undesirable characteristic, e.g. the previously mentioned Chu et al. article postulates that the marked charge instability of $Si–Si_3N_4$ and $Si–Si0_2–Si_3N_4$ structures under a large voltage bias results from a tunneling and trapping of carriers in the vicinity of the $Si–Si_3N_4$ interface while Brown et al. in an article entitled "Properties of $Si_xO_yN_z$ Films on Si" in the Mar. 1968 issue of the Journal of the Electrochemical Society, p. 311, suggests a polarization effect occurs when the applied field is sufficiently large to force electrons through a thin oxide layer to a substantially thicker nitride (or oxynitride) layer wherein the electrons are trapped. Although the exact cause for the transfer characteristic shift is not critical for purposes of this invention, it does appear that an internal charge transfer (by polarization or tunneling) is effected by the application of a large voltage bias pulse to the gate electrode whereupon the transferred charge is trapped upon subsequent removal of the bias pulse.

The time-voltage accumulation and depletion characteristics of CISFET 10 are depicted by the curves of FIG. 3 illustrating the shift in flat band voltage with accumulated pulse width. In general, the flat band voltage varies linearly with the log of the accumulated width of applied count pulses of a chosen magnitude. For example, the flat band voltage is shifted from an initial value of +10v. to approximately 0 volts by pulsing electrode 22 with one 100 microsecond, or five 20 microsecond, count pulses having an amplitude of −90 volts. Thus, each applied −90v. count pulse shifts the flat band voltage by an amount proportional to the log of the count pulse width and the effect is cumulative with equal shifts e.g. from +19 v. to approximately −7.5v., being obtained by the application of one 1 millisecond, two 500 microsecond, five 100 microsecond or twenty-five 20 microsecond count pulses of −90v. to gate electrode 22.

CISFET 10 also exhibits a nonlinear time-voltage cumulative enhancement characteristic when gated by positive polarity count pulses of varying period and amplitude. As can be observed from curve 29 of FIG. 3, the flat band voltage of CISFET 10 can be shifted from approximately −10.5 volts to a flat band voltage of 0 volts by the application of five 20 microsecond or one 100 microsecond count pulses having an amplitude of +80 volts. When the amplitude of the count pulses is increased to +90 volts, as illustrated by curve 33, the flat band voltage is shifted from an initial value of approximately −11.5v. to approximately 15v. by one 1 millisecond, ten 100 microsecond or fifty 20 millisecond count pulses of +90v.

The dependence of the shift in flat band voltage upon the amplitude and pulse width of the applied count pulses is further illustrated by the curves of FIG. 4 wherein individual count pulses from +70 to +100v. are applied for diverse periods to gate electrode 22. As can be seen from the curves, a 20 microsecond, 80 v. pulse shifts the flat band voltage from an initial value of −10.5v. to approximately −5v., while single 90 and 100 volt pulses of 20 microseconds shift the flat band voltage from −12.5v. to approximately +4 and +12 volts, respectively. Similarly a single +80 volt pulse of 3 microseconds shifts the flat band voltage from −12.5v. to −11v. while 20 and 500 microsecond pulses of identical amplitude shift the flat band voltage to −5v. and +2v., respectively. The shift in flat band voltage therefore is nonlinearly cumulative and the number of count pulses required to shift the flat band voltage of CISFET 10 to a given DC bias is determined both by the magnitude and pulse width of the applied count pulses. Count pulses below 50v. generally were insufficient to effect a shift in the flat band voltage of a field effect transistor having 300 A. silicon oxide layer and a 1500 A. silicon nitride layer forming the insulator between the gate and semiconductive substrate.

The amplitude of the applied count pulse required to effect a shift in the transfer characteristics is dependent primarily upon the thickness of oxide layer 18 and can vary from very low values, e.g. ±5 volts for oxide films below 50 A. to a substantially higher amplitude of ±50v. for oxide layers of 300 A. or more. Because relatively thick silicon dioxide films tend to stabilize the charge instability of CISFET 10, ideally oxide layer 18 should compose no more than approximately 30 percent of the total insulator thickness to permit both the relatively free flow of carriers thereacross under a large voltage bias and a trapping of the carriers at the $SiO_2$–$Si_3N_4$ interface upon the removal of the large voltage bias from the gate electrode. In general, the amplitude of the count pulse is substantially larger than, e.g. in excess of three fold, the initial value of flat band voltage. To effect a depletion in CISFET 10, e.g. shift the transfer characteristic to a more negative gate voltage, the count pulses are applied in a negative potential while positive potential count pulses effect an enhancement in the CISFET shifting the transfer characteristic to a more positive flat band voltage. Enhancement therefore generally produces an instantaneous current flow because the applied count pulse necessarily is in excess of the turn on voltage of the CISFET while depletion can be accomplished without instantaneous conduction in the CISFET. The exact shift in flat band voltage for a given applied count pulse is best obtained empirically as the characteristics of the insulator may depend strongly on its method of preparation.

The voltage-time dependence of CISFET 10 permits utilization of the CISFET as a variable counter as is depicted in the single stage counter of FIG. 5 wherein CISFET 10 serves as a variable voltage divider for voltage source 26. Drain electrode 16 and contact 24 of CISFET 10 are grounded while source electrode 14 is connected to voltage source 26 through a high value, e.g. 1 megohm, resistor 28. In the operation of the counter of FIG. 5, count pulses 29 of a predetermined amplitude and duration, e.g. −70 volt, 20 microsecond count pulses, are superimposed upon a DC biasing voltage 30 of 0 volts, e.g. the chosen flat band voltage, to form composite waveform 31 of FIG. 6A and the composite waveform is applied to gate electrode 22 through lead 32 to shift the flat band voltage upon the application of each negative going count pulse to the gate electrode. Each count pulse successively shifts the flat band voltage, as shown in FIG. 6B, by a given amount dependent upon the amplitude and width of the count pulses until the flat band voltage is shifted to the value of the applied DC biasing voltage 30 whereupon CISFET 10 becomes conductive during the interval biasing voltage 30 is applied to the gate electrode. The voltage at point 36 thereupon drops from a potential equal to voltage source 26 to a value of approximately ground potential. By positioning a filtering circuit 38 between voltage point 36 and output terminal 40, any small fluctuations in voltage produced by the application of the count pulses to gate electrode 22 are minimized and an output voltage $v_o$, depicted in FIG. 6C, is obtained having a first amplitude 42 equal to the source voltage 26 when CISFET 10 is nonconducting and having a second amplitude 44 substantially equal to ground potential when the shift of the transfer characteristic to the biasing voltage produces conductivity in CISFET 10. Because the shift in flat band voltage varies as a function of the amplitude and pulse width of the applied count pulses, a switching in the potential of output voltage $v_o$ at diverse counts, e.g. after a differing number of applied count pulses, can be effected by a variation in the amplitude and/or pulse width of the applied count pulses or by an alteration of the DC biasing voltage upon which the count pulses are superimposed.

After the switching of CISFET 10 from a stable generally nonconductive state to a stable highly conductive state, a reset signal of a polarity opposite the polarity of the count pulses is applied through conductor 45 to gate electrode 22 to return CISFET 10 to a nonconductive state. As can be appreciated from the graphs of FIG. 3, the amount of enhancement produced by the reset signal (and therefore the number of pulses of a fixed amplitude and width required to subsequently switch CISFET 10 to a conductive state), is dependent both upon the amplitude of the reset voltage and the period for which the reset voltage is applied to gate electrode 22. Thus the subsequent count of the circuit of FIG. 5 for an identical applied waveform 30 can be altered merely by an alteration in the enhancement produced by the reset signal.

The required amplitude of the applied count pulse to produce a given shift in the transfer characteristic of CISFET 10 can be reduced in proportion to the magnitude of an enabling pulse applied to contact 24. For example, if the thickness of oxide and nitride insulating layers 18 and 20, respectively, generally require the gating of electrode 22 with three +80 volts, 500 μ count pulses to switch the CISFET to a conductive state, the CISFET also can be switched to a conductive state by the application of three +30 volts, 500 μ pulses to the gate electrode simultaneously with three −50 volts, 500 μ enabling voltage pulses to aluminum contact 24 on substrate 12. Thus switching of CISFET 10 is accomplished when the sum of the enabling voltage and the gate electrode voltage exceed the required voltage threshold of the nitride-oxide insulator to effect a shift in the transfer characteristic of CISFET 10.

Although the count of CISFET 10 is determined in FIG. 5 by the measured variation in voltage resulting from an alteration in the conductive state of the CISFET, the count also can be sensed by a variation in current flow using the circuitry depicted in FIG. 7. Therein, source and drain electrodes 14 and 16 respectively, are directly connected between a source of positive voltage 26 and ground with a current filter 44 being serially connected in the circuit to filter out transient conduction of the CISFET. For simplicity of explanation, enabling contact 24 is depicted as being rounded although a DC biasing voltage could be employed to reduce the amplitude of the count pulse. The circuit of FIG. 7 operates in a manner similar to that of FIG. 5 with each applied count pulse 29, depicted in FIG. 8A, to electrode 22 shifting the flat band voltage by an amount determined by the amplitude and duration of the count pulse until the flat band voltage of the CISFET reaches or exceeds the DC biasing voltage, e.g. voltage 30, continuously applied to gate electrode 22. Thereupon CISFET 10 is switched to a stable conductive state, identified by a current pleateau 50 of FIG. 8B as sensed at the output terminal 52 of current filter 44. The CISFET then can be returned to a stable nonconductive state by the application to gate electrode 22 of a positive polarity reset voltage.

One circuit for producing suitable count pulses for the circuits of FIGS. 5 and 7 is shown in FIG. 9 wherein a plurality of pulses 52 have varying amplitudes and pulse widths are to be counted. Pulses 52 are fed to a clipping circuit 54, such as a Zener diode, to produce a waveform having a predetermined amplitude and the variation in the width of pulses 52 is corrected by feeding the clipped waveforms into differentiator 56 to produce a plurality of pulses 58 having a common pulse width (determined by the transient response of differentiator 56) and a common amplitude (determined by the cutoff level of clipping circuit 54). Pulses 58 then are fed through rectifying circuit 60 to remove the positive going excursions of pulses 58 produced by differentiation and the unipolarity pulses from rectifying circuit 60 are transmitted through gating circuit 62 to gate electrode 22 of CISFET 10. It will be appreciated that a variation in the parameters of either clipping circuit 54 or differentiator 56 alters the amplitude and pulse width, respectively, of the applied count pulses to gate electrode 22 thereby varying the count producing a switching in the conductive state of CISFET 10.

Although the reset voltage applied to gate electrode 22 to shift the transfer characteristic of the CISFET to the enhancement region can be produced by the pulse forming circuitry of FIG. 9, preferably the reset voltage is generated by a square wave generator having an alterable amplitude and/or pulse width. Thus a single reset voltage pulse applied to gate electrode 22 can reset CISFET 10 to diverse predetermined counts without an alteration in the count pulses applied to gate electrode 22. For example, the conductive state of the CISFET may initially switch upon the application of 3 count pulses to gate electrode 22 and, upon being reset with a reset voltage pulse of a substantially longer period, 4 count pulses may be required before a switching occurs in the conductive state of the CISFET.

When high accuracy or an enlarged count is desired, a plurality of CISFETs preferably are cascaded as shown in FIG. 10 wherein similar reference numerals are utilized to identify identical elements in each stage. In the cascaded counter CISFETs 10$a$, 10$b$, and 10$c$, are connected in parallel with the drain electrode of each CISFET being connected to ground while the source electrodes are connected to common source voltage 26A through resistors 28$a$, 28$b$, and 28$c$, respectively. The superimposed count pulses and DC biasing voltage forming waveform 31 for energizing the gate electrodes of each of CISFETS 10$a$, 10$b$ and 10$c$ are applied to conductor 62 and conducted to the gate electrode of each CISFET through suitable controlled switches, e.g. conventional IGFETs 64$a$, 64$b$, and 64$c$, while an enabling voltage of +30 volts, for example, is applied to contacts 24$a$, 24$b$, and 24$c$ through conductor 65 to reduce the amplitude of the count pulse required to shift the transfer characteristic of the CISFETs. Resistors 66$b$ and 66$c$ are connected in series with IGFETs 64$b$ and 64$c$ to limit current flow through the IGFETs upon the initiation of a counting operation. To assure that a stage of the counter is not triggered by the incoming count pulses prior to a switching of the previous stage of the counter, IGFETs 68$b$ and 68$c$ are employed to shunt the gate electrodes of CISFETs 10$b$ and 10$c$ to ground potential in the normal conductive mode of the IGFETs. The gate electrodes 69$b$ and 69$c$ of each shunting IGFETs 68$b$ and 68$c$ are connected to the source electrode of the prior stage CISFET to switch the IGFETs to a nonconductive mode only upon the initiation of conduction in the CISFET of the prior stage, e.g. when CISFET 10$a$ is switched to a highly conductive state, the voltage at point 36$a$ effectively is reduced to zero thereby removing the biasing voltage upon IGFET 68$b$. IGFET 68$b$ then is switched to a nonconductive mode permitting the application of count pulses on conductor 62 to gate electrode 22$b$ of CISFET 10$b$. Preferably resistors 66$b$ and 66$c$ connected in series with IGFETs 64$b$ and 64$c$ between conductor 62 and the gate of the associated CISFETs 10$b$ and 10$c$, respectively, are of extremely large ohmic value relative to the resistance of IGFETs 68$b$ and 68$c$ in a conductive mode and of small ohmic value relative to the resistance of the IGFETs in a nonconductive mode.

In operation, switching IGFETs 64$a$, 64$b$, 64$c$, 68$b$, and 68$c$ initially are in a conductive mode whereupon count pulses and a DC biasing voltage forming switching waveform 31 are applied to conductor 62 and an enabling DC voltage is applied to contacts 24$a$, 24$b$, and 24$c$ through conductor 65. The count pulses of switching waveform 31 are initially applied to gate electrode 22$a$ of CISFET 10$a$ through conductive IGFET 64$a$ simultaneously with the enabling voltage to shift the transfer characteristic of CISFET 10$a$ while IGFETs 68$b$ and 68$c$ function to maintain the gate electrodes of CISFETs 10$b$ and 10$c$ at ground potential. Because the magnitude of the enabling pulse along is insufficient relative to the oxide layer thickness to shift the transfer characteristic of CISFETs 10$b$ and 10$c$, only the transfer characteristic of CISFET 10$a$ initially is shifted toward the DC biasing voltage of waveform 31. After the application of a predetermined number of count pulses to the gate electrode of CISFET 10$a$, the flat band voltage shifts to the DC biasing voltage of waveform 31 and CISFET 10$a$ switches to a conductive state. The voltage of point 36$a$ thereupon is reduced to effectively zero switching IGFET 68$b$ to a nonconductive state and permitting the application of the count pulses to the gate electrode of CISFET 10$b$. The voltage reduction at point 36$a$ also is transmitted to the gate electrode of IGFET 64$a$ to block the applied waveform upon conductor 62 from the gate electrode of CISFET 10 $a$. The counting pulses on conductor 62 in combination with the enabling voltage biasing the substrate effect a shift in the transfer characteristic of CISFET 10$b$ while IGFET 68$c$ continues to maintain the gate electrode of CISFET 10$c$ at ground potential to inhibit a shift in the transfer characteristic of CISFET 10$c$. After the application of the fixed number of count pulses required to effect a shift in the flat band voltage of CISFET 10$b$ to the DC biasing voltage of waveform 31, CISFET 10$b$ is switched to a conductive state and the potential at point 36$b$ effectively is reduced to ground level thereby opening IGFET 64$b$ to block further counting pulses to the gate electrode of CISFET 10$b$. The reduction in the potential of point 36$b$ is transmitted to the gate electrode of IGFET 68$c$ to permit the application of the count pulses on conductor 62 to CISFET 10$c$ through resistor 66$c$ and conductive IGFET 64$c$. Shifting of the flat band voltage of CISFET 10$c$ by the applied count pulses is continued until the flat band voltage equals the biasing voltage of waveform 31 whereupon CISFET 10$c$ switches to a stable conductive state and the output voltage at point 36$c$ is reduced to effectively zero. Thus the voltage at point 36$c$ is indicative of the total count accumulated by CISFETs 10$a$, 10$b$, and 10$c$.

The nonvolatility of the counters of this invention is depicted by the graph of FIG. 11 wherein the variation in flat band voltage of CISFET 10 under short circuit conditions is depicted with time. As can be seen from the graph, the flat band voltage of a short circuited CISFET varies linearly with the log of hours at room temperature and drops from a value of approximately ±17.2 volts to a value of +15.7 volts, e.g. less than 9 percent, within 100 hours and less than 20 percent within 1000 hours. The linear decrease in the flat band voltage under short circuit conditions with the log of hours and the linear shift in flat band voltage with the log of the applied count signal indicates the flat band shift and charge leakage processes to be of a similar nature. The inherent stability of the CISFET can be further increased by an increase in the thickness of oxide layer 18 intermediate the nitride layer and the silicon substrate. However, because the thickness of oxide layer 18 is inversely proportional to the charge instability of the CISFET for a given gate voltage pulse, low voltage, relatively volatile CISFETs are formed having a minimum oxide layer intermediate nitride layer 20 and silicon substrate 12.

Although this invention has been described employing time-voltage depletion to switch the CISFET to a conductive state, the counters of FIGS. 5 and 7 also can utilize the time-voltage accumulation characteristic of the CISFET to effect a count by a switching of the MISFET from a conductive state to a nonconductive state. For accumulation counting, the width of the count pulse should be a small fraction of the period, e.g. less than 10 percent of the period, to avoid overdriving the CISFET.

What I claim as new and desire to secure by Letters Pat. of the U.S. is:

1. A nonvolatile counter comprising a conductor-insulator-semiconductor field effect transistor characterized by a nonuniform stored charge distribution in the insulator under a large voltage bias, means for applying a plurality of counting pulses of predetermined configuration to the gate electrode of said transistor, the amplitude of said pulses exceeding the threshold voltage required to shift the transfer characteristic of said transistor and the width of a single said pulse being less than the total width required to shift the transfer characteristic from an original flat band voltage to a preselected bias voltage, means for applying said preselected bias voltage to said transistor, and means for detecting the conductive state of said transistor.

2. A nonvolatile counter according to claim 1 including means for applying a reset voltage pulse to said gate electrode in a polarity opposite the polarity of said count pulses.

3. A nonvolatile counter according to claim 2 further including means for controlling the waveform of said reset pulse to alter the number of count pulses required to effect an alteration in the conductivity of said transistor.

4. A nonvolatile counter according to claim 1 wherein said semiconductor is silicon and at least a portion of said insulator includes a zone of silicon nitride.

5. A nonvolatile counter according to claim 4 wherein said field effect transistor is formed of a silicon wafer having source and drain regions diffused therein, a silicon dioxide layer overlying said silicon wafer intermediate said source and drain electrodes, a silicon nitride layer overlying said silicon dioxide layer and a metal electrode overlying said silicon nitride layer.

6. A nonvolatile counter according to claim 5 including means for applying a voltage to said silicon wafer to reduce the amplitude of the count pulses required to shift the transfer characteristic of said transistor.

7. A nonvolatile counter comprising a plurality of conductor-insulator-semiconductor field effect transistors having source, drain and gate electrodes therein, each of said transistors being characterized by a nonuniform stored charge distribution in the insulator under a large voltage bias, said source and drain electrodes of said transistors being respectively connected to common sources of potential, count means connected to the gate electrode of each transistor, said pulses from said count means effecting a shift in the transfer characteristic of said transistor by a predetermined amount upon application thereto, first switching means disposed between said count means and the gate electrodes of each of said plurality of transistors for blocking pulses from said count means to the gate electrode of each transistor dependent upon the state of conduction of the transistor, and second switching means interconnecting each of said transistors with an adjacent transistor for applying pulses from said count means to the gate electrode of each transistor only upon a switching in the conductive state of said interconnected transistor.

8. A nonvolatile counter according to claim 7 wherein said semiconductor is silicon and further including means for applying an enabling pulse to the silicon semiconductor to reduce the amplitude of the pulse from said count means required to switch the conductive state of said transistor.

9. A nonvolatile counter according to claim 7 including reset means connected to the gate electrode of each transistor for applying a pulse to said gate electrodes in a polarity opposite the polarity of the applied pulses from said count means.

10. A nonvolatile counter according to claim 9 including means for controlling the amplitude and period of said reset pulses to vary the number of pulses of a predetermined magnitude and duration from said count means required to shift the transfer characteristic from an original position to a preselected bias voltage.

11. A nonvolatile counter according to claim 7 including means for varying the pulse width of the waveform from said count means to alter the number of pulses required to shift the transfer characteristic from an original position to a preselected bias voltage.

12. A nonvolatile counter according to claim 7 wherein said first switching means are insulated gate field effect transistors serially connected between said count means and the gate electrode of said conductor-insulator-semiconductor field effect transistors and further including means for applying an enabling voltage to the semiconductor substrate of said conductor-insulator-semiconductor field effect transistors to reduce the magnitude of the applied pulse from said count means required to shift the transfer characteristic of said transistors.

13. A counter comprising a transistor having a semiconductive wafer exhibiting a first type electrical conductivity, source and drain electrodes of a second type conductivity diffused into said wafer at spaced apart coplanar locations to provide an area of first type conductivity separating said electrodes, a leaky dielectric with traps overlying said area intermediate said source and drain electrodes, a conductive electrode overlying said dielectric, said transistor being characterized by a nonuniform charge distribution in the insulator under a large voltage bias, means for applying a first voltage to said conductive electrode of a magnitude insufficient to exceed the threshold voltage required to shift the transfer characteristic of said transistor and means for applying a second voltage to said first type conductivity region, said second voltage being cumulative with said first voltage pulse to shift the transfer characteristic of said transistor upon the simultaneous application of said first and second voltages to said transistor.

14. A counter according to claim 13 wherein said dielectric is formed of juxtaposed layers of silicon nitride and silicon dioxide.